United States Patent [19]
Easley

[11] 3,773,396
[45] Nov. 20, 1973

[54] SHAFT SUPPORTING ASSEMBLY INCLUDING A FLUID DEFLECTING BEARING SPACER

[75] Inventor: Sydney E. Easley, Indianapolis, Ind.
[73] Assignee: General Motors Corporation, Detroit, Mich.
[22] Filed: Oct. 30, 1972
[21] Appl. No.: 302,095

[52] U.S. Cl. .............................................. 308/187
[51] Int. Cl. ........................................... F16c 33/66
[58] Field of Search .................................... 308/187

[56] References Cited
FOREIGN PATENTS OR APPLICATIONS
930,700  7/1963  Great Britain ...................... 308/187

Primary Examiner—Charles J. Myhre
Assistant Examiner—Frank Susko
Attorney—Paul Fitzpatrick et al.

[57] ABSTRACT

An annular spacer for the outer races of two bearings supporting a shaft in a housing is coaxial with the shaft. The spacer has projecting ears at each axial end engaging slots in the outer race and housing to prevent rotation of the spacer or outer race with respect to the housing. The spacer has one or more axially extending holes for the escape of fluid lubricant and an inwardly projecting fin on the far side, in the direction of shaft rotation, of each hole to direct lubricant out through the hole into a collection chamber in the housing.

2 Claims, 2 Drawing Figures

SHAFT SUPPORTING ASSEMBLY INCLUDING A FLUID DEFLECTING BEARING SPACER

BACKGROUND OF THE INVENTION

The invention herein described was made in the course of work under a contract or subcontract thereunder with the Department of Defense.

This invention relates to apparatus for spacing and cooling bearings supporting a shaft in high speed machinery, such as a gas turbine engine. A particularly serious problem with high speed shafts is the dissipation of heat from the shaft bearings. A relatively large volume of lubricant must be made to flow through and around the bearing and must be collected and cooled thereafter for recirculation. If the circulating lubricant becomes trapped adjacent the bearing, sufficient heat can build up in the bearing to cause bearing failure.

In addition, because of the danger of bearing overheating, it is often desirable to place temperature sensing thermocouples in the outer races of the bearings to monitor bearing temperature. This requires that the outer races be locked in place in the housing against rotation, as well as axially. The standard snap rings used for bearing retention do not lock a bearing race against rotation; and the use of additional devices with the snap rings to accomplish this purpose would produce extra undesirable manufacturing and assembly costs and difficulties.

My invention, therefore, suggests the use of an annular bearing spacer member which has, on its opposite axial ends, surfaces for contact with the bearing outer races and projecting ears for engagement with corresponding slots in the bearing outer races and housing to prevent the rotation of the outer races and spacer with respect to the housing. To prevent the build up of lubricant in the space between the bearings, spacer and shaft, the spacer is provided with one or more axially extending holes, or slots through which the lubricant can escape into the surrounding collection chamber. Adjacent to each of these holes is a radially inwardly extending fin. Considering the direction of shaft rotation, these fins are placed on the far side of the holes so that the lubricant, which has been given tangential momentum by the shaft, impinges on the fins and is directed out through the hole into the collection chamber. Additional objects and details of my invention will be apparent in the following specification and drawings.

SPECIFICATION OF THE PREFERRED EMBODIMENT

Figure 1:
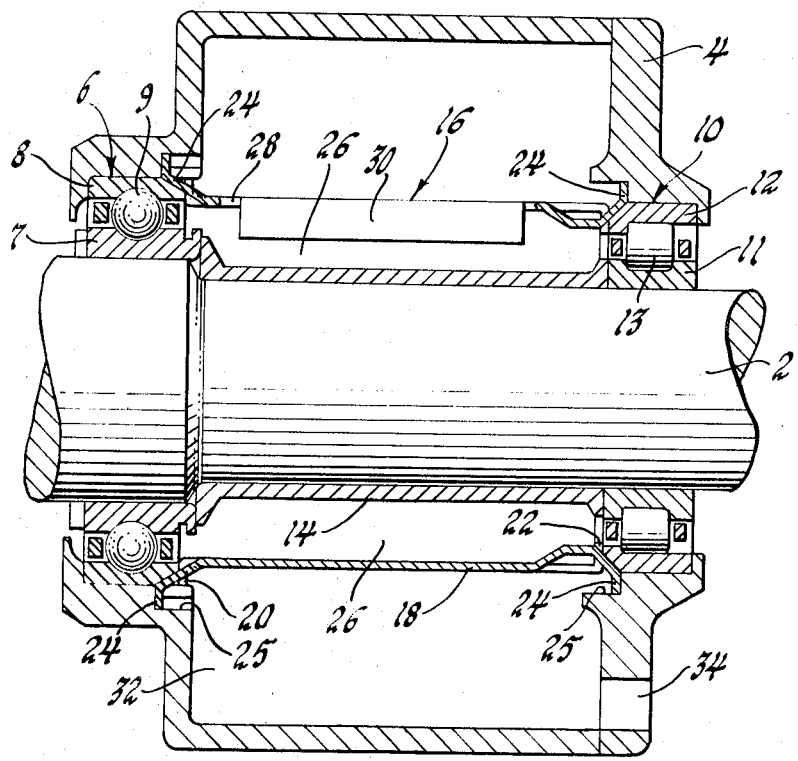
FIG. 1 shows a cutaway view of my invention in its environment.

Referring to FIG. 1, a shaft 2 is capable of rotation at a high speed in housing 4. The shaft 2 could be a turbine or a compressor shaft in a turbine engine, for example; and the housing 4, a portion of the engine housing. The shaft 2 is supported by ball bearing assembly 6 and roller bearing assembly 10. The ball bearing assembly 6 is a standard ball bearing assembly comprising an inner race 7, an outer race 8 and a plurality of balls 9 therebetween. The inner race 7 is capable of rotation with the shaft 2; and the outer race 8, as will be described later, is fixed against such rotation. The roller bearing assembly 10 is also standard. It comprises an inner race 11, an outer race 12 and a plurality of rollers 13. A roller bearing assembly is used here to allow for differences in axial thermal expansion between the elements; since roller bearings, unlike ball bearings, do not support axial loads, such expansion is allowed. An inner spacer sleeve 14, mounted coaxially on the shaft 2, separates the inner races 7 and 11; the outer races 6 and 10 are separated by a fluid deflecting spacer 16.

Figure 2:
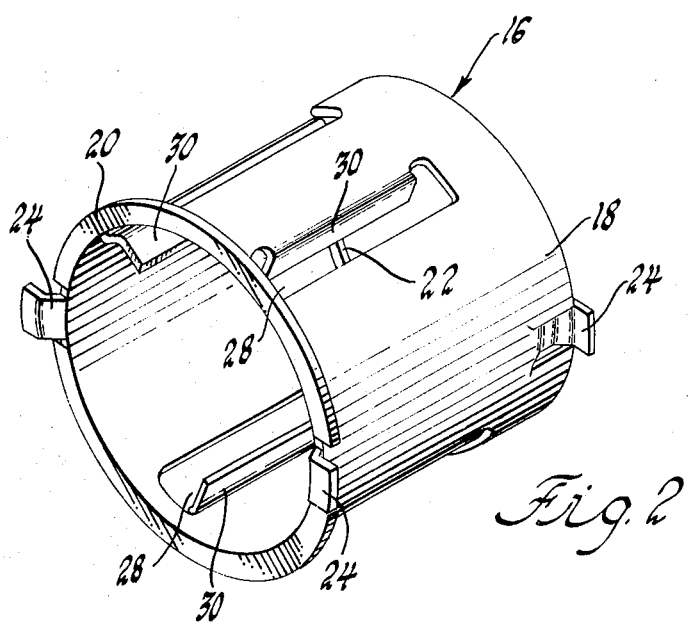
FIG. 2 shows a preferred embodiment of my invention.

Referring to FIG. 2, the fluid deflecting spacer 16 comprises a rigid annular portion 18 which has one of its axial ends flattened radially outward to form a first bearing contact surface 20 and the other axial end flattened inward to form a second bearing contact surface 22. Ears 24 project from each axial end of the spacer 16 and engage corresponding slots 25 formed in the housing 4 and the outer races 8 and 12. These projecting ears 24 prevent the spacer 16 and the outer races 8 and 12 from rotating with the shaft 2.

A fluid lubricant, such as oil, is sprayed onto the bearing inner races 7 and 11 by conventional means such as oil jets, not shown. This oil lubricates and cools the bearing assemblies 6 and 10; and the major portion of it then flows into the space 26 between the inner spacer sleeve 14, the fluid deflecting spacer 16 and the bearing assemblies 6 and 10. A large portion of the oil within the space 26 has been atomized into a mist of fine droplets at high temperature; and most of it has received a tangential momentum about the shaft 2 from the bearing assemblies 6 and 10. The fluid deflecting spacer 16, therefore, is provided with axially extending holes or slots 28, through which the oil can escape. The fluid deflecting spacer 16 is also provided, adjacent each axially extending hole 28, with an inwardly extending fin 30 upon which the oil with a tangential momentum will impinge. The oil is partially reliquefied since the tiny droplets, upon striking the fin 30, tend to merge into larger, heavier droplets. The fins 30 accomplish the dual purpose of helping to reliquefy the oil and directing it out through the holes 28. Once outside the holes 28, the oil is in a cooling and collection chamber 32 in which it falls or runs down the walls to the drain 34.

It can be seen, therefore, that my invention is a useful device that accomplishes the combined purposes of spacing bearings supporting a shaft, preventing the outer races of such bearings from rotating with the shaft invention to assisting the draining of lubricant away from the bearings. The embodiment insuring is only a preferred embodiment; and others will certainly occur to those skilled in the art.

I claim:

1. A shaft supporting assembly comprising, in combination:

a housing having a plurality of slots therein;

a shaft rotatable in the housing;

at least two bearing assemblies rotatably supporting the shaft in the housing; the bearing assemblies being cooled and lubricated by lubricant circulating therethrough, each bearing assembly having an outer race with at least one slot therein;

and a bearing spacer between the two bearing assemblies, the bearing spacer having a rigid annular portion coaxial with the shaft, a surface on each axial end thereof for contact with an outer race of a bearing assembly, one or more axially extending holes in the annular portion thereof for escape of lubricant therefrom, a radially inwardly bent axially extending fin adjacent each axially extending hole on the far side of said hole in the direction of shaft rotation for deflection of lubricant through said hole, and at least one projecting ear on each axial end thereof effective to engage a slot in an outer race of a bearing assembly and a slot in the housing to prevent rotation of the bearing spacer or outer race with respect to the housing.

2. A fluid deflecting bearing spacer for use with a shaft rotatably supported in a housing on two axially displaced bearings, each of the bearings having an inner race adjacent the shaft and capable of rotation therewith, an outer race retained in the housing and lubricant circulating therethrough, the bearing spacer comprising an annular metal member having:

a rigid annular portion;

a surface on each axial end of the rigid annular portion thereof for contact with and spacing of the outer races of the bearings;

one or more axially extending holes in the rigid annular portion thereof for escape of lubricant therefrom;

a radially inward bent axially extending fin adjacent each axially extending hole on the far side of said hole in the direction of rotation of the shaft for deflection of lubricant through said hole;

and at least one projecting ear on each axial end thereof effective to engage corresponding slots in the bearing outer race and the housing to prevent crowned of either with respect to the annular member or each other.

* * * * *